United States Patent
Relyea et al.

(10) Patent No.: US 8,767,959 B2
(45) Date of Patent: Jul. 1, 2014

(54) BLOCK ENCRYPTION

(75) Inventors: Robert Relyea, Sunnyvale, CA (US); Jeffrey J. Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 111 days.

(21) Appl. No.: 13/307,983

(22) Filed: Nov. 30, 2011

(65) Prior Publication Data

US 2013/0136256 A1    May 30, 2013

(51) Int. Cl.
*H04L 9/18* (2006.01)
*H04L 9/34* (2006.01)

(52) U.S. Cl.
USPC ............................................. 380/37; 380/42

(58) Field of Classification Search
None
See application file for complete search history.

(56) References Cited

PUBLICATIONS

Correlation Analysis of Random Number Sequences based on Pseudo Random Binary Sequence Generation. Horan et al. IEEE(2005).*
Cryptanalytic Attacks on Pseudorandom Number Generators. Kelsey et al. LNCS(1998).*
Chaos and Cryptography: Block Encryption Ciphers Based on Chaotic Maps. Jakimoski et al. IEEE(2001).*

* cited by examiner

*Primary Examiner* — Venkat Perungavoor
(74) *Attorney, Agent, or Firm* — Lowenstein Sandler LLP

(57) ABSTRACT

Methods and systems for encrypting and decrypting data are described. In one embodiment, a computing system determines a first initialization vector (IV) from another IV and a sequence number of a block of information, and hashes the first IV to create a hash. The computing system then determines a first block from the first block of information and the first hash and enciphers the first block to generate a block of ciphertext. In another embodiment, the computing system deciphers the block of ciphertext to generate the first block, and determines the first IV from the other IV and a sequence number of a block of information. The computing system hashes the first IV to create a hash and determines a block of information corresponding to the first block of ciphertext from the first block and the hash.

26 Claims, 7 Drawing Sheets

Concatenation

BLOCK ENCRYPTION

TECHNICAL FIELD

Embodiments of the present invention relate to data encryption, and more specifically to data encryption that addresses security issues of block ciphers and improves on cipher block chaining.

BACKGROUND

Encryption is a process of transforming information (referred to as plaintext) into an unreadable form (referred to as ciphertext). Decryption is a transformation that recovers the plaintext from the ciphertext. A cipher typically performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher. As such, the term "encipher" and "encrypt" may be used interchangeably in the following discussion. Likewise, the term "decipher" and "decrypt" may also be used interchangeably in the following discussion.

Encryption is often used to protect military and civilian systems, examples of which include Internet e-commerce, mobile telephone networks, bank automatic teller machines, etc. As technology and computing power advance, new vulnerabilities may be commonly discovered for encryption mechanisms that were previously considered secure. When such weaknesses are discovered, new encryption mechanisms and techniques may be required to maintain security of sensitive information.

Conventionally, ciphertext block chaining provides an encryption mode to prevent an attacker from being able to create a code table from commonly repeated blocks. For instance, a block of all space characters results in the same ciphertext block. Specifically, an output stream is prepended with a random block, which is referred to as an initialization vector (IV). For each block to be enciphered, the IV is combined with the current block of plaintext using a binary exclusive or (XOR) operation. Then the resulting block is enciphered. The current IV is replaced with the resulting enciphered block, which is appended to the output stream.

The above conventional approach is reasonably fast and strong. However, such approach may not completely eliminate all output patterns. In particular, if the same output block is produced more than once for the same key, it may be possible to determine some statistical information about the plaintext of the blocks that follow. The above possibility may exist even if the block occurs in a different output stream. Therefore, data security may be compromised.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
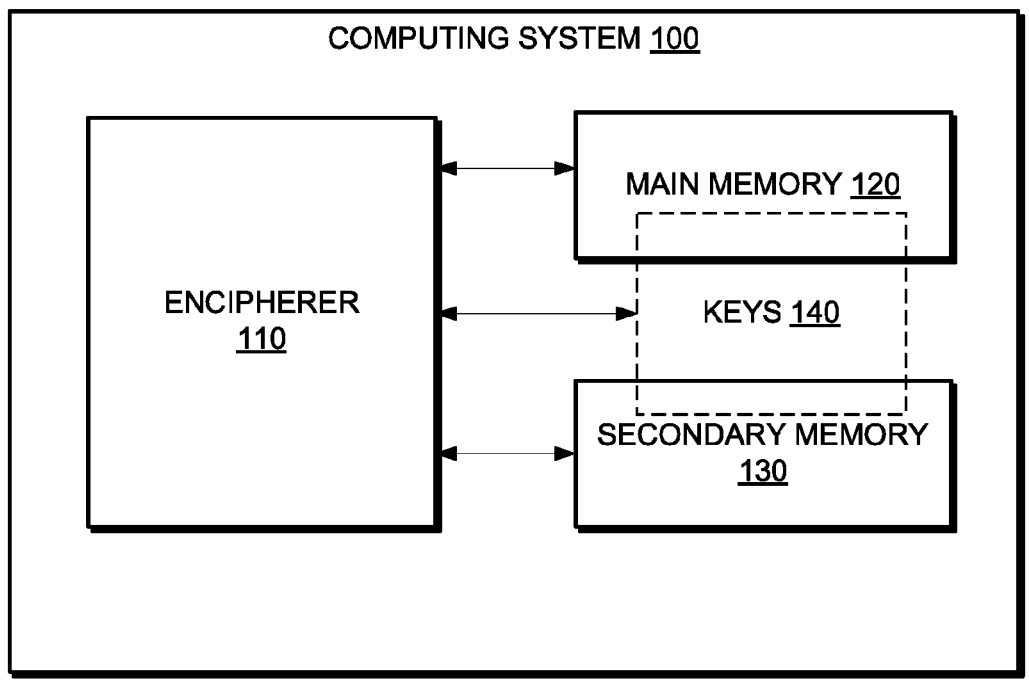
FIG. 1 is a block diagram of one embodiment of a computing system executing an encipherer.

Methods and systems for encrypting and decrypting data are described. In one embodiment, a computing system determines a first initialization vector (IV) from another IV and a sequence number of a block of information, and hashes the first IV to create a hash. The computing system then determines a first block from the first block of information and the first hash and enciphers the first block to generate a block of ciphertext. In another embodiment, the computing system deciphers the block of ciphertext to generate the first block, and determines the first IV from the other IV and a sequence number of a block of information. The computing system hashes the first IV to create a hash and determines a block of information corresponding to the first block of ciphertext from the first block and the hash.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "performing," "enciphering," "encrypting," "deciphering," "decrypting," "generating," "communicating," "capturing," "executing," "defining," "specifying," "creating," "processing," "providing," "computing," "calculating," "determining," "displaying," "detecting," "sending," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of one embodiment of a computing system 100 executing an encipherer 110. The computing system 100 may be a personal computer, a server, a personal data assistant (PDA), a mobile device, or other types of computing system as would be appreciated by one of ordinary skill in the art having the benefit of this disclosure. The computing system 100 includes encipherer 110 connected with a main memory 120 and a secondary memory 130. Details of some embodiments of encipherer 110 are described below with respect to FIG. 2. The main memory 120 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 130 may include one or more persistent data storage devices that may include, for example static memory, hard drives, optical drives, tape backup systems, etc. The secondary memory 130 may be local to the computing system 100 (as illustrated), or external to the computing system 100.

In one embodiment, keys 140 are stored in secondary memory 130. In another embodiment, keys 140 are stored in main memory 120. Keys 140 may be stored, for example, in a protected region of main memory 120 or secondary memory 130 (memory accessible only to certain processes). In yet another embodiment, keys 140 are stored externally to computing system 100. Such externally stored keys 140 may be stored, for example, in a universal serial bus (USB) dongle, firewire dongle, or other external storage device. In embodiments that implement external keys, encrypted regions of the main memory 120 and secondary memory 130 may not be decrypted unless the external storage device having keys 140 is communicatively coupled to computing system 100.

Figure 2:
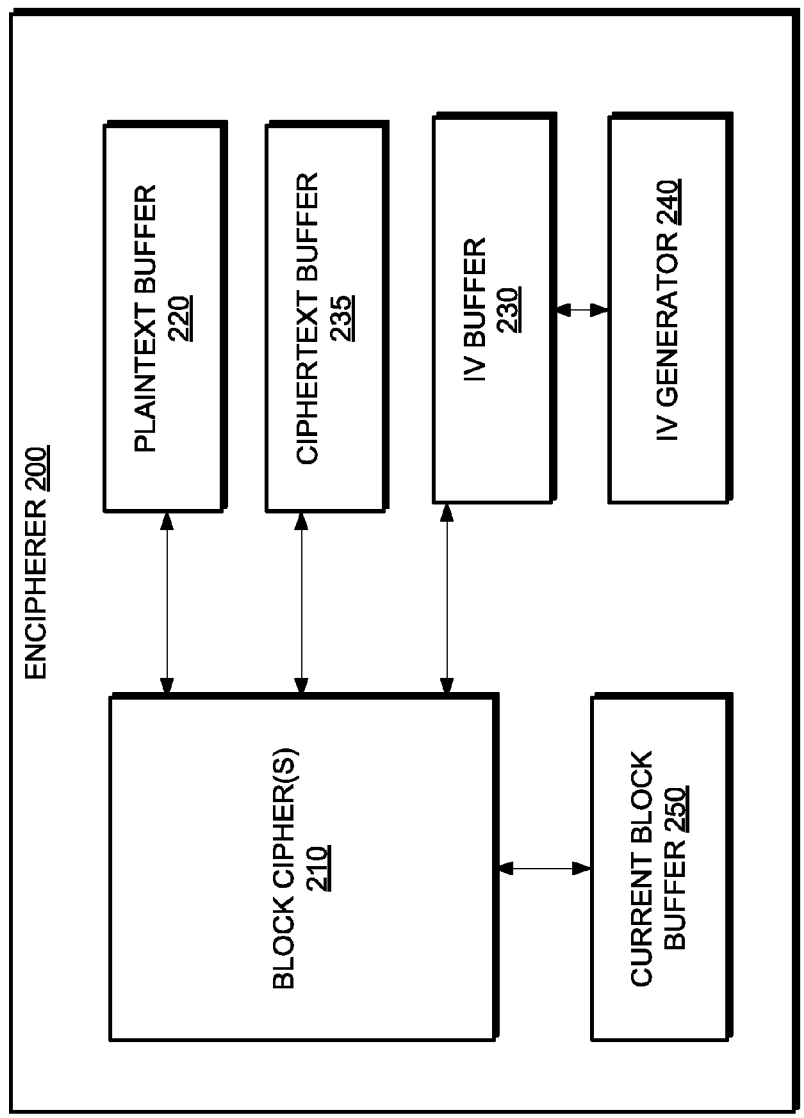
FIG. 2 is a block diagram of the encipherer of FIG. 1 according to one embodiment.

Keys 140 may include one or more block cipher keys for use with block cipher(s) of encipherer 110 (e.g., 210 of FIG. 2). In one embodiment, keys 140 may also include the initialization value to use in current block buffer 250 of encipherer 110 when encryption or decryption is started. In an alternative embodiment, the initialization value used is fixed. In one embodiment, keys 140 determine which one or more of the block cipher(s) 210 are used by encipherer 110. In an alternative embodiment, this selection is fixed. In one embodiment, keys 140 are encrypted such that a password should be provided to enable access to them. Alternatively, keys 140 may not be encrypted. In another embodiment, the initialization values may be salts stored in the file storing the blocks to be encrypted or decrypted. In one embodiment, each file can have a unique salt. As described below, the salt may be combined with a sequence number corresponding to the block to be encrypted or decrypted, such as a block number, a byte number, or another value associated with the block.

In one embodiment, encipherer 110 is a hardware component of computing system 100. Alternatively, encipherer 110 may include software that is part of an operating system, an application, or a combination thereof. Encipherer 110 may also be a combination of two or more of software, firmware, and hardware.

In some embodiments, encipherer 110 can encipher data in the main memory 120 and the secondary memory 130 to secure such data. When enciphering data, new keys may be generated and stored, or existing keys may be provided. In one embodiment, the encipherer 110 is configured to encrypt data in all of secondary memory 210 and main memory 220. In another embodiment, only some of the data in main memory 120 and/or secondary memory 130 is encrypted (e.g., using filesystem-level encryption). In both instances, encrypted data may not be read or used until encipherer 110 deciphers the enciphered data using the same keys 140 used to encrypt the data.

FIG. 2 is a block diagram of the encipherer 200 of FIG. 1 according to one embodiment. The encipherer 200 may correspond to the encipherer 110 of FIG. 1. The encipherer 200 enciphers (or encrypts) and deciphers (or decrypts) data. In one embodiment, the encipherer 200 includes one or more block ciphers 210, which are coupled to one or more input buffers and one or more output buffers. When encrypting, the input buffers are identified as the plaintext buffer 220 and IV buffer 230, and the output buffer is identified as the ciphertext buffer 135. The IV buffer 230 may be coupled with an IV (initialization vector) generator 240. When decrypting, the input buffers are identified as the ciphertext buffer 235 and the IV buffer 230, and the output buffer is identified as the plaintext buffer 220. The encipherer 200 may also include a current block buffer 250 coupled to the block ciphers 210.

Block ciphers 210 are substitution ciphers that operate on fixed-length groups of bits known as blocks. Where data to be encrypted is longer than a block, the data may be divided into multiple blocks, and each block is separately encrypted. In one embodiment, block ciphers may execute an encryption and a decryption algorithm, each of which accepts an input block of size n bits as a first input and a key of size k bits as a second input, and produce an n-bit output block. For example, a block cipher might take as an input a 128-bit block of plaintext (which is unenciphered data) and an 80 bit key, and output a corresponding 128-bit block of ciphertext (which is ciphered data). Likewise, the block cipher may take as an input a 128-bit block of ciphertext and the 80 bit key, and output a 128-bit block of plaintext. In another embodiment, the encryption algorithm may accept an input block of size m bits, and output a block of size n bits, and the decryption algorithm may accept an input block of size n bits, and output a block of size m bits. Some exemplary block sizes for a block cipher to operate on include 64 bit (i.e., 8 byte) and 128 bit (i.e., 16 byte), and some exemplary common key sizes include 40 bits, 56 bits, 64 bits, 80 bits, 128 bits, 160 bits, 168 bits, 192 bits, and 256 bits. Other sized blocks and keys may also be used. Some examples of block ciphers include twofish, blowfish, serpent, data encryption standard (DES), advanced encryption standard (AES), CAST5, international data encryption algorithm (IDEA), etc.

Plaintext buffer 220 may be a storage device or part of a storage device that contains unencrypted data. The data may be either awaiting encryption, or the result of decryption.

Likewise, ciphertext buffer 235 may be a storage device or part of a storage device that contains encrypted data. The data may be either awaiting decryption, or the result of encryption.

In some embodiments, IV generator 240 generates random or unpredictable sequences of bits that are of the same size as the input block size of the block ciphers 210. The encipherer 200 may direct IV generator 240 to generate one or several of these bit sequences at a time, and store the resulting sequences in ciphertext buffer 235. In one embodiment, the IV generator 240 generates a current IV and inputs the current IV into the block cipher 210. The block cipher performs a first function, such as a XOR operation or a concatenation operation, to combine the IV from the IV generator 240 with a sequence number of a the block being encrypted. The sequence number can be a block number, a byte number, or other number that identifies the block being encrypted. The block cipher 210 hashes the result of the XOR operation. The hash can then be concatenated with the block of plaintext and then encrypted to generate the block of ciphertext. In another embodiment, the IV generator 240 retrieves a stored IV (and possibly encrypted IV), such as on a per-file basis.

Current block buffer 250 may be a storage device or part of a storage device large enough to contain a bit sequence that is the same size as the input block size or the output block size of the block ciphers 210. Block ciphers 210 may retrieved data to be enciphered from current block buffer 250 when encrypting. Alternatively, block ciphers 210 may store the deciphered data into current block buffer 250 when decrypting.

In some embodiments, data is encrypted by encipherer 200 in sequential blocks. Encipherer 200 may start encryption by directing IV generator 240 to provide one or more blocks of data to use as initialization vectors, and storing them into ciphertext buffer 235. The current block buffer may be initialized with a particular value. Each block from plaintext buffer 220 to be encrypted may be combined with a hash of the current IV from the IV buffer 230 and a block number of the plaintext block being encrypted. The hash may be stored in the current block buffer 250. Similarly, the result of combining the hash and the block of plaintext may be stored in the current block buffer 250 as a temporary block before being encrypted into a block of ciphertext. The contents of current block buffer 250 may be enciphered using one or more of block ciphers 210, and the resulting ciphertext may be appended to the current contents of ciphertext buffer 235. For example, the block of ciphertext can be stored in the ciphertext buffer 235 and subsequently stored in a file in the filesystem. Alternatively, the block of ciphertext can be communicated to another device as would be appreciated by one of ordinary skill in the art having the benefit of this disclosure.

In some embodiments, data is decrypted by encipherer 200 in sequential blocks. The blocks of ciphertext may be stored in the current block buffer 250 before being decrypted into a block of plaintext. The contents of current block buffer 250 may be deciphered using one or more of block ciphers 210, and the resulting plaintext may be appended to the current contents of plaintext buffer 220. Encipherer 200 may start decryption by initializing current block buffer 250 identically to how it was initialized while encrypting. Each block from ciphertext buffer 235 is deciphered and can be stored in the current block buffer 250 as temporary blocks before calculating the blocks of plaintext using the hash. The deciphered block can be combined with the hash of the current IV and the sequence number corresponding to the ciphertext block to generate the corresponding block of plaintext. The encipherer 200 can store the block of plaintext in the plaintext buffer 220. As described above, the hash may be stored in the current block buffer 250.

By combining random initialization vectors (IVs) and corresponding sequence numbers of the blocks and hashing the combined result, the encipherer 200 removes patterns from the plaintext that may extend beyond the size of a single block. By using one or more blocks chosen from a set of blocks in a manner that cannot be determined without access to the plaintext, encipherer 200 removes patterns that may be apparent when the size of the plaintext is very large (for example, larger than a terabyte). By using one or more blocks chosen in a manner that depends on both the plaintext, block number, IV, and the key, certain cryptographic attacks against block cipher(s) 210 may be made more difficult.

In one embodiment, the encipherer 200 can be used in the context of securing data stored in a file system. Each file may store a salt for the IV for that particular file, with each file storing a unique salt or a different salt. By combining the salt with the block numbers, adjacent blocks can be scrambled in a way that prevents attacks of inspection or modification. In one embodiment, the salts and IVs may have a relationship that is used for identity, but is not required. In another embodiment, the encipherer 200 can be used in the context of secure transmission, such as communicating the data securely from a first computing system to a second computing system over a network as would be appreciated by one of ordinary skill in the art having the benefit of this disclosure.

The embodiments described herein can be used to address the problem of preventing others from both unauthorized inspection and unauthorized modification of data. These embodiments can be used against attacks when the attacker has partial information about the contents of a block. For example, by having both the plaintext and the ciphertext for that block simultaneously, the attacker would be able to recover a key stream and that would essentially render that portion of the file transparent to the attacker. In symmetric encryption operations, such as a block method or a stream method, if a user is encrypting two files with the same key, an attacker can capture the stream and recover the key in one file if the attacker knows the plaintext of one of the files. It can use the known plaintext to discover the keys used in the one file or one data stream, and can recover some of the random stream and use the recovered stream to recover data in other files or streams where the attacker doesn't know the plaintext. One approach is to not use the same key for different files, however, in some environments, changing the keys frequently for each file can be unusually burdensome.

The simplest form of encryption modes is the electronic codebook (ECB) mode. The file or data object is divided into blocks and each block is encrypted separately. However, this mode has a disadvantage of identical plaintext blocks being encrypted into identical ciphertext blocks, failing to hide patterns. In ECB, because a codebook is created, you can look at the plaintext and the ciphertext and determine what is going on logically. So, parts of the encrypted stream could become visible to an attacker if the attacker knows that this code is encoded with this plain text and can come up with this cipher text with this key. In an attempt to get around this problem, a value, known as an initialization vector (IV) can be used. The IV is XORed with your plain text and the result is encrypted. The encrypted value can then be used as the IV for the next block in the file so that IV changes for every block in the file. Therefore, an attacker cannot know, therefore even though you have plain text, two places where there are the same plain text in the block and using the same key, the plaintext will not always produce the same cipher text. So that's called cipher-block chaining (CBC).

Figure 3A:
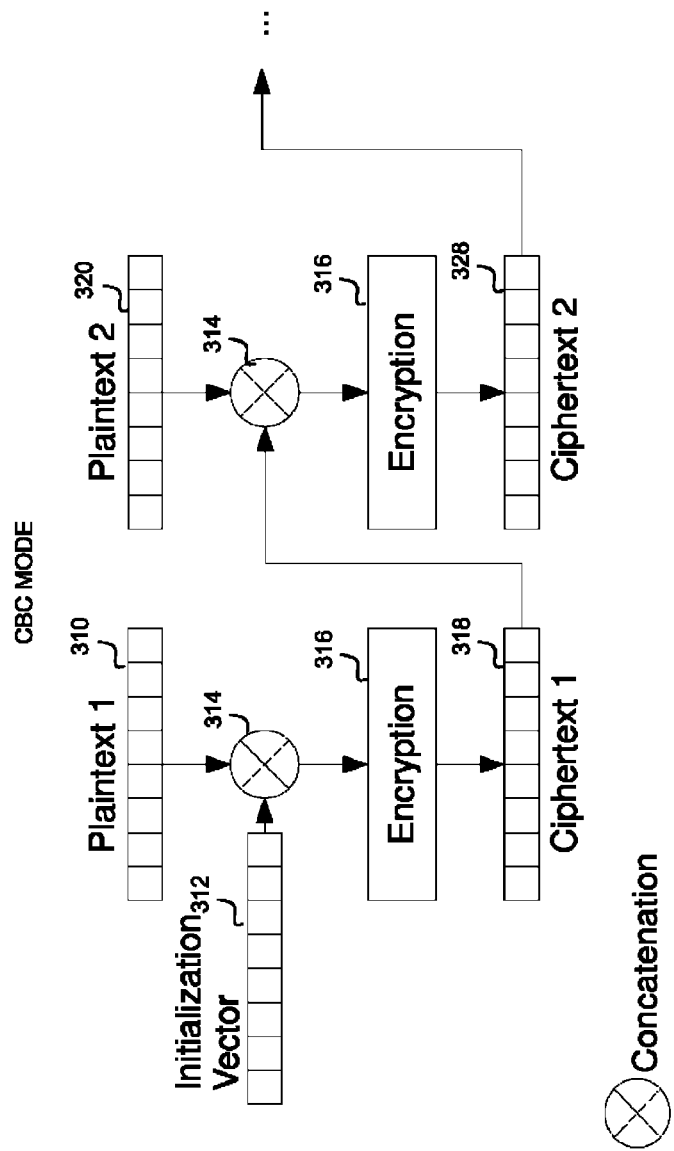
FIG. 3A illustrate cipher-block chaining (CBC).

FIG. 3A illustrate cipher-block chaining (CBC). In CBC mode, each block of plaintext is XORed with the previous ciphertext block before being encrypted. This way, each ciphertext block is dependent on plaintext blocks processed up to that point. Also, to make a file or data object unique, an initialization vector (IV) is used in the first block. CBC has a commonly used mode of operation. Some of its drawbacks are that encryption is sequential (i.e., it cannot be parallelized), and that the file or data object are padded to a multiple of the cipher block size. Note that a one-bit change in a plaintext or IV affects the following ciphertext blocks. Decrypting with the incorrect IV causes the first block of plaintext to be corrupt but subsequent plaintext blocks will be correct. This is because a plaintext block can be recovered from two adjacent blocks of ciphertext. As a consequence, decryption can be parallelized. Note that a one-bit change to the ciphertext may cause corruption of the corresponding block of plaintext, and invert the corresponding bit in the following block of plaintext, but the rest of the blocks remain intact.

In FIG. 3A for CBC mode, plaintext block 310 is concatenated 314 with an initialization vector (IV) 312. The result of the concatenation 314 is encrypted 316 into ciphertext block 318. The ciphertext block 318 is used as the IV for the next plaintext block 320. In particular, the plaintext block 320 is concatenated with the ciphertext block 318, and the result of the concatenation 314 is encrypted 316 into ciphertext block 328. This process can be repeated for other plaintext blocks of the file.

The cipher block chaining mode works well if plaintext is encrypted and transmitted to another computing system. However, a drawback of CBC is that an attacker can take a first portion of a data stream and can inject the data to be encrypted in order to determine data further down in the stream. For example, an attacker can inject what is going to be encrypted and make iterative guesses about the data being encrypted. If the attacker knows what is being XORed, the attacker can actually produce a stream that will produce the same encryption for that cipher text guess, so that the attacker can then compare it to encrypted blocks and determine that they are the same when the attacker guesses right. This technique can be used to steal cookies from the browser because the attacker knows portions of the data and can uses those known portions to guess about the remaining data.

CBC is not generally used in the context of encrypting files in a file system that is random access. An attacker can go to a particular block and write it because the file system is random access. The attacker may not have the key used for the file they are not authorized to access, but can write another file of which they know the contents, and from which the attacker can determine the key to access the other file. Thus, a file system would be vulnerable to this kind of attack because an attacker could just keep writing that same block over and over again in the file.

Figure 3B:
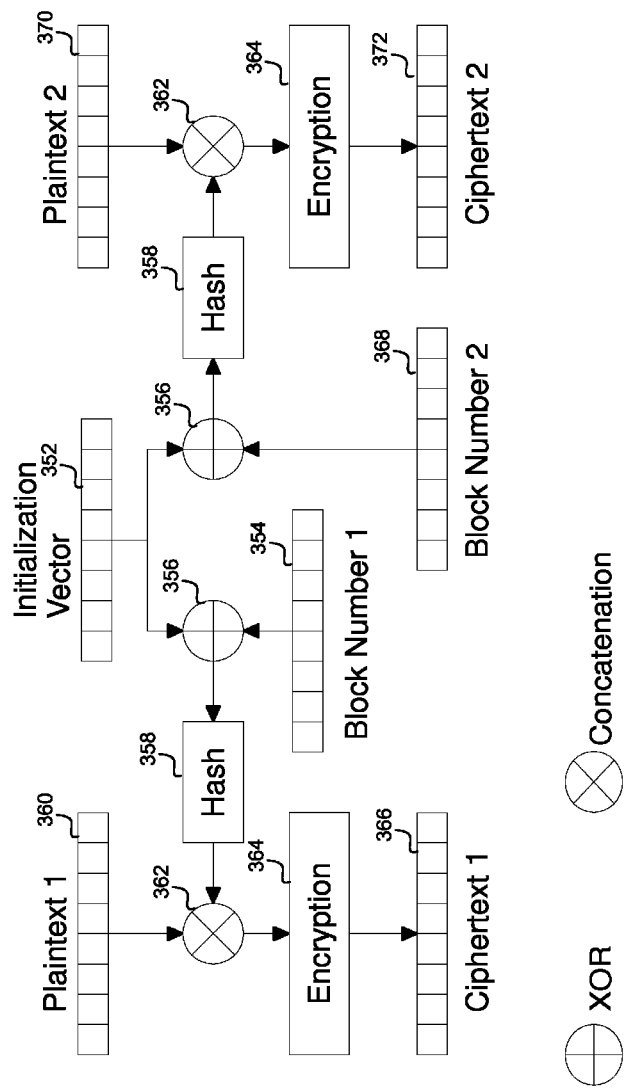
FIG. 3B illustrate cipher-block encryption using embodiments of the present invention.

FIG. 3B illustrate cipher-block encryption using embodiments of the present invention. In this embodiment, an initialization vector (IV) 352 is XORed 356 with a block number 354 corresponding to a first plaintext block 360. The result of the XOR 356 is hashed to create a hash 358 of the IV 352 and the block number 354. The plaintext block 360 is concatenated with the hash 358, and the result is encrypted 364 to create a first ciphertext block 366. For an adjacent block, such as another block of the same file, the initialization vector 352 is also XORed 356 with a block number 368 corresponding to a second plaintext block 370. The result of the XOR 356 is hashed to create a hash 358 of the IV 352 and the block number 368. The plaintext block 370 is concatenated with the hash 358, and the result is encrypted 365 to create a second ciphertext block 372. This may be repeated for other blocks of the file with the same IV 352. The IV 352 may be stored in the file or in connection with the file. The IV 352 may be encrypted, and thus decrypted before being XORed with the block numbers. The IV 352 may be a salt as described herein. In other embodiments, the file may use more than one IV for the blocks of data of a file as would be appreciated by one of ordinary skill in the art having the benefit of this disclosure. In one embodiment, each file in the file system can store a unique IV or different IVs to further protect the data from unauthorized inspection or unauthorized modification of the data. It should be noted that the IV 352 can be concatenated with the block number 354 or the block number 368. It should also be noted that the hashing function can be used so that a small change on the input of the hashing function dramatically changes the output. That way, even if the IV 352 is public or becomes public, this would not compromise the filesystem. In particular, even if the block numbers are not very different, the hash generated with those block numbers, which are used as inputs into the plaintext concatenation, will be very different from block to block.

In one embodiment, the security of the file system can be protected in a three-fold manner. First, separate keys per file can be used so that attacks across files become potentially inoperative. Second, the IV for each block within a file can be based on two things. For example, a salt that is stored with the file can be self-encrypted using an encryption key, which is not known to the attacker, and the salt can be combined with the block number (XORed or concatenated) to create the temporary IV. Third, after combining the salt with the block number, the result (e.g., temporary IV) can be hashed. The nature of the hashing is that even if the inputs are similar, the outputs will be dissimilar. This provides another level of scrambling of adjacent block IVs. Using these three approaches, the file system can be protected against cross-file attacks, guessing type attacks from zero information, as well as guesses based on two adjacent blocks.

Figure 4A:
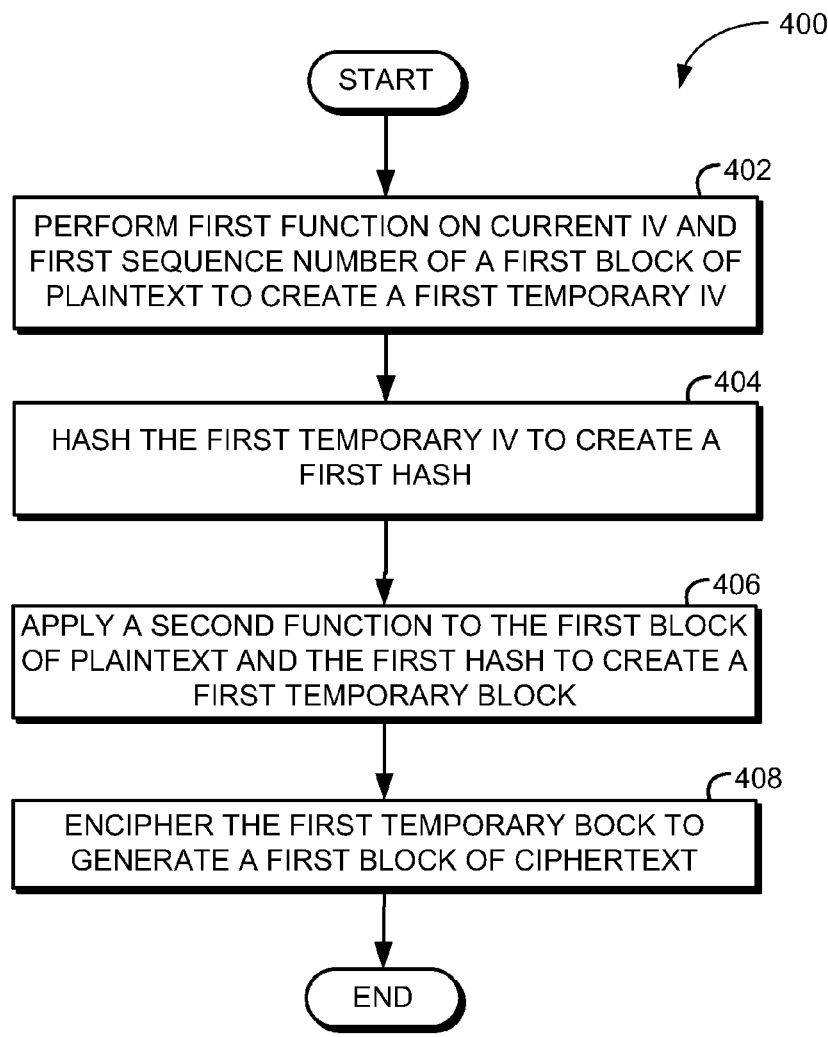
FIG. 4A is a flow diagram of one embodiment of a method of encrypting data.

FIG. 4A is a flow diagram of one embodiment of a method 400 of encrypting data. The method 400 is performed by processing logic that may comprise hardware (circuitry, dedicated logic, etc.), software (such as is run on a general purpose computing system or a dedicated machine), firmware (embedded software), or any combination thereof. In one embodiment, the encipherer 110 or encipherer 200 of FIGS. 1 and 2 performs the method 400. Alternatively, other components of the computing system 100 can perform some or all of the operations of method 400.

Referring to FIG. 4A, processing logic begins with performing a first function to a current IV and first sequence number of a first block of plaintext to create a first temporary IV (block 402). Next, processing logic hashes the first temporary IV to create a first hash (block 404). The processing logic applies a second function to the first block of plaintext and the first hash to create a first temporary block (block 406). Next, the processing logic enciphers the first temporary block to generate a first block of ciphertext (block 408), and the method 400 ends.

In one embodiment at block 402, the processing logic performs a concatenation operation as the first function to combine the first sequence number of the first block of plaintext and the current IV. In another embodiment at block 402, the processing logic performs an XOR operation on the first sequence number of the first block of the plaintext and the current IV. Alternatively, other types of operations may be performed for the first function to combine or scramble the current IV and the first sequence number as would be appreciated by one of ordinary skill in the art having the benefit of this disclosure.

In yet another embodiment, the processing logic appends the first block of ciphertext to an output stream. In another embodiment, the processing logic stores the first block of ciphertext in an file stored on the computing system, such as in a file system managed by the computing system. In one embodiment, the current IV is a salt stored with a file containing the first block of plaintext, and each file may contain a unique salt. In cryptography, a salt includes random bits. The salt may be an input to a one-way function, while the other input may be a password or passphrase. This way the salt can be stored instead of the passphrase, but still can be used for encrypting. In one embodiment, the salt is encrypted with an encryption key and is decrypted before being combined with a sequence number corresponding to the block, such as a block number (a byte number that represents the block being encrypted).

In another embodiment at block 406, the processing logic performs an XOR operation on the first block of plaintext and the first hash as the second function. In another embodiment, the processing logic performs other types of operations to scramble the first temporary IV with the first block of plaintext as would be appreciated by one of ordinary skill in the art having the benefit of this disclosure.

In yet a further embodiment, the processing logic applies a third function to the current IV and a second sequence number of a second block of plaintext to create a second temporary IV. The processing logic hashes the second temporary IV to create a second hash of the current IV and the second sequence number. The processing logic applies a fourth function to the second block of plaintext and the second hash to create a second temporary block. The processing logic enciphers the second temporary block to generate a second block of ciphertext. The second block of ciphertext may be stored in the file like the first block of ciphertext. Alternatively, the second block of ciphertext may be appended to an output data stream. Like the first and second functions, the third and fourth functions may be concatenation operations, XOR operations, or other operations to combine or scramble the current IV, the second sequence, the second block of plaintext and the second hash as would be appreciated by one of ordinary skill in the art having the benefit of this disclosure.

Figure 4B:
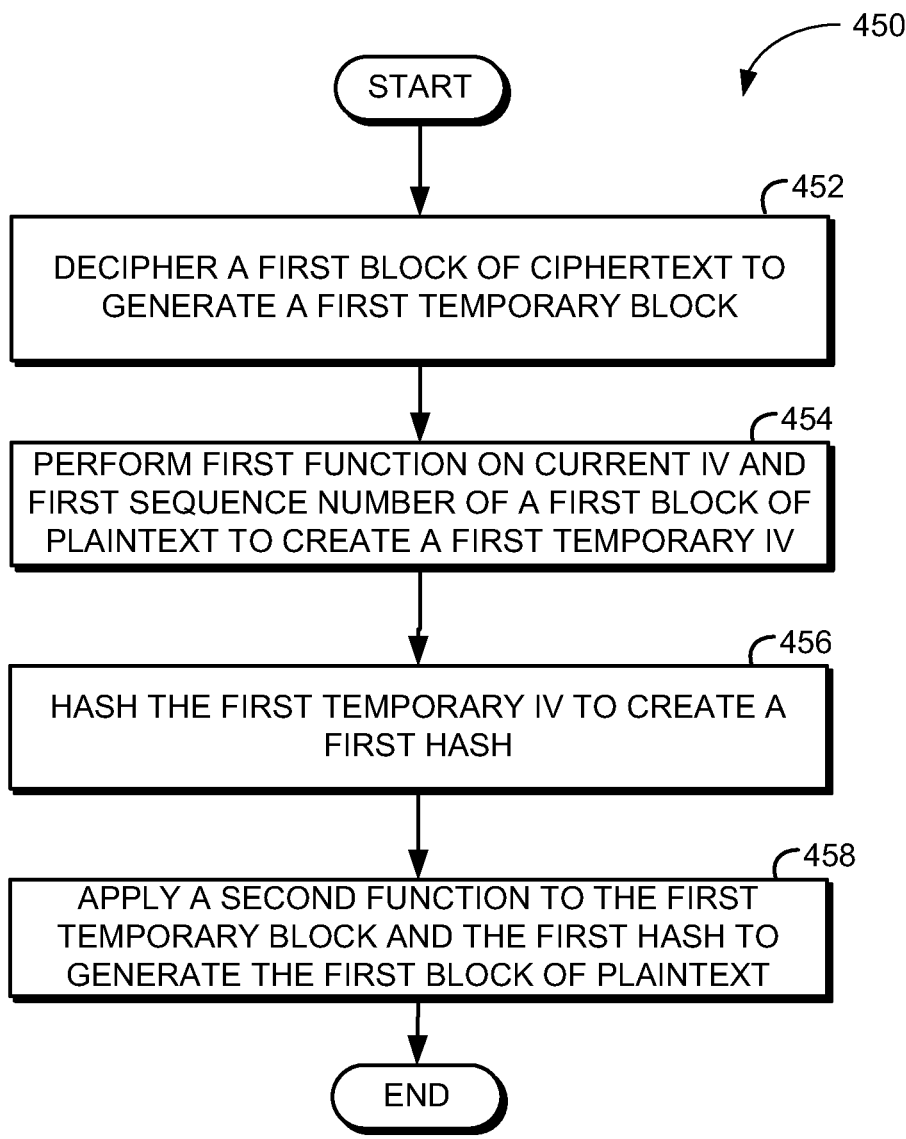
FIG. 4B is a flow diagram of one embodiment of a method of decrypting data.

FIG. 4B is a flow diagram of one embodiment of a method 450 of decrypting data. The method 450 is performed by processing logic that may comprise hardware (circuitry, dedicated logic, etc.), software (such as is run on a general purpose computing system or a dedicated machine), firmware (embedded software), or any combination thereof. In one embodiment, the encipherer 110 or encipherer 200 of FIGS. 1 and 2 performs the method 450. Alternatively, other components of the computing system 100 can perform some or all of the operations of method 450.

Referring to FIG. 4B, processing logic begins with deciphering a first block of ciphertext to generate a first temporary block (block 452). The processing logic performs a first function on a current IV and a first sequence number of a first block of plaintext to create a first temporary IV (block 454). Next, the processing logic hashes the first temporary IV to create a first hash (block 456), and applies a second function to the first temporary block and the first hash to generate the first block of plaintext (block 458), and the method 450 ends.

In one embodiment at block 454, the processing logic performs a concatenation operation to combine the first sequence number of the first block of plaintext with the current IV for the first operation. In another embodiment at block 454, the processing logic performs an XOR operation on the first sequence number and the current IV. Alternatively, other types of operations may be performed for the first function to combine or scramble the current IV and the first sequence number as would be appreciated by one of ordinary skill in the art having the benefit of this disclosure.

In another embodiment at block 458, the processing logic performs an XOR operation on the first temporary block and the first hash as the second function. In another embodiment, the processing logic performs other types of operations to scramble the first temporary block and the first hash as would be appreciated by one of ordinary skill in the art having the benefit of this disclosure.

In yet another embodiment, the processing logic receives the first block of ciphertext as part of an input data stream. In another embodiment, the processing logic retrieves the first block of ciphertext stored in a file stored on the computing system, such as in a file system managed by the computing system. In one embodiment, the current IV is a salt stored with the file containing the first block of ciphertext, and each file may contain a unique salt. In one embodiment, the salt is encrypted with an encryption key and is decrypted before being combined with a sequence number corresponding to the block.

In yet a further embodiment, the processing logic deciphers a second block of ciphertext to generate a second temporary block. The processing logic applies a third function to the current IV and a second sequence number of a second block of plaintext to create a second temporary IV, and hashes the second temporary IV to create a second hash of the current IV and the second sequence number. The processing logic applies a fourth function to the second temporary block and the second hash to generate the second block of plaintext corresponding to the second block of ciphertext. The second block of ciphertext may be received from the input data stream or from the stored filed, as described above for the first block of ciphertext. Like the first and second functions, the third and fourth functions may be concatenation operations, XOR operations, or other types of operations as would be appreciated by one of ordinary skill in the art having the benefit of this disclosure.

Figure 5:
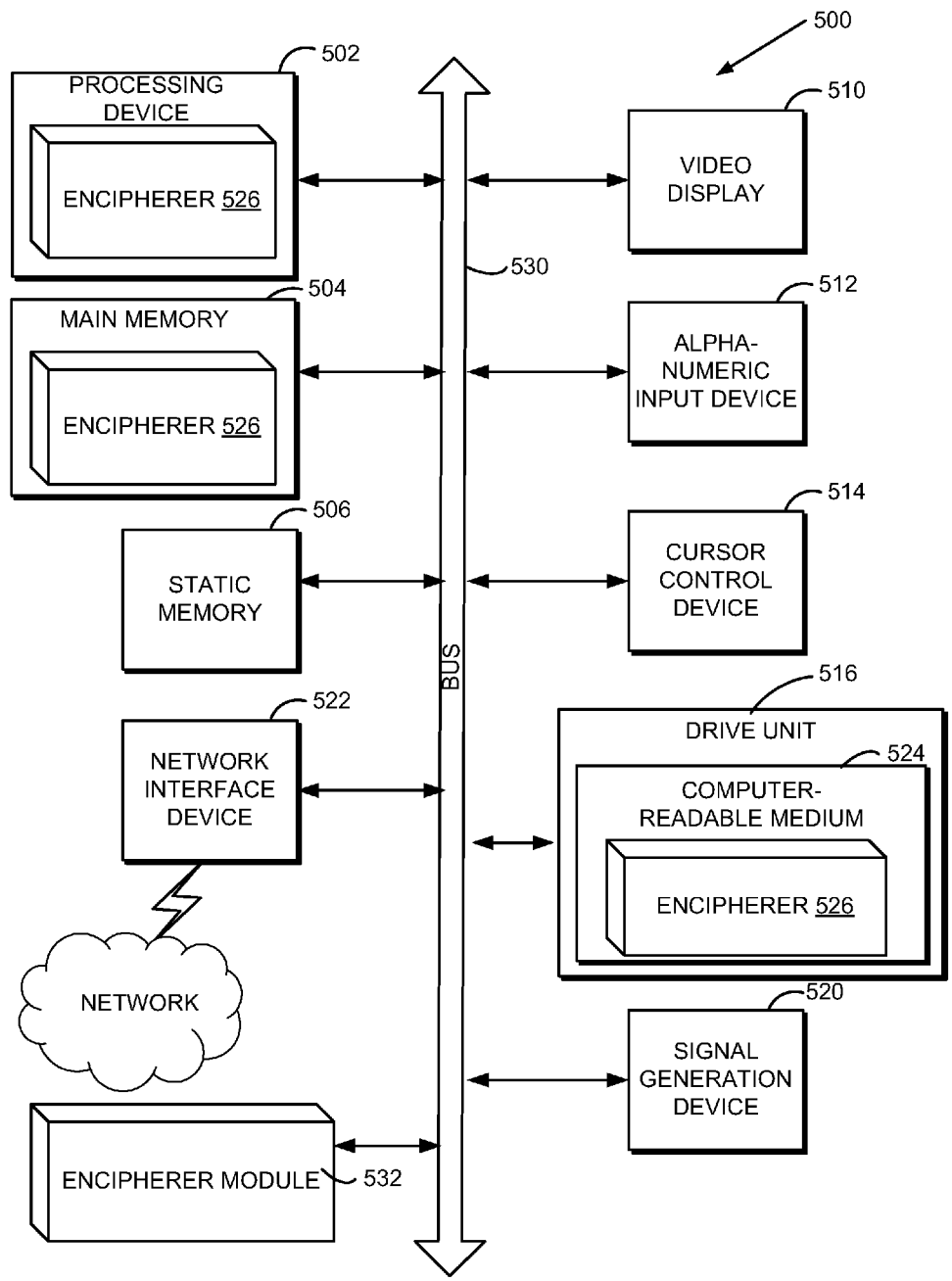
FIG. 5 illustrates a diagrammatic representation of a machine in the exemplary form of a computing system for encipherer.

FIG. 5 illustrates a diagrammatic representation of a machine in the exemplary form of a computing system 500 for encipherer. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for encipherer, such as the methods 300, 320, and 350 described above. In one embodiment, the computing system 500 represents various components that may be implemented in the computing system 100 as described above. Alternatively, the computing system 100 may include more or less components as illustrated in the computing system 500. In another embodiment, the computing system 500 represents various components that may be implemented in the computing system 100.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., encipherer 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., encipherer 526) embodying any one or more of the methodologies or functions described herein. The encipherer 526 may also reside, completely or at least partially, within the main memory 504 and/or within the processing device 502 during execution thereof by the computing system 500, the main memory 504 and the processing device 502 also constituting computer-readable storage media. The encipherer 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The encipherer module 532, components, and other features described herein (for example in relation to FIGS. 1-3B) can be implemented as discrete hardware components or integrated in the functionality of hardware components such as ASICS, FPGAs, DSPs, or similar devices. The encipherer module 532 may implement operations of encipherer as described herein with respect to FIGS. 3A-4B. In addition, the encipherer module 532 can be implemented as firmware or functional circuitry within hardware devices. Further, the encipherer module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
combining, with a processing device, a first initialization vector (IV) with a first sequence number of a first block of information to create a first combined IV, the first IV being generated based on a second IV;
hashing the first combined IV to create a first hash;
combining a first block from the first block of information with the first hash to create a first combined block; and
enciphering the first combined block to generate a first block of ciphertext.

2. The method of claim 1, wherein combining the first IV comprises concatenating the first sequence number of the first block of information and the second IV.

3. The method of claim 1, wherein combining the first IV comprises performing an exclusive-OR (XOR) operation on the first sequence number of the first block of information and the second IV.

4. The method of claim 1, wherein combining the first block comprises performing an exclusive-OR (XOR) operation on the first block of information and the first hash.

5. The method of claim 1, wherein the second IV is a salt stored with a file containing the first block of information, wherein the salt is encrypted using an encryption key, and wherein the method further comprises decrypting the salt before combining the first IV.

6. The method of claim 1, further comprising:
combining a third IV with a second sequence number of a second block of information to create a second combined IV, the third IV being generated based on the second IV;
hashing the second combined IV to create a second hash;
combining a second block from the second block of information with the second hash to create a second combined block; and
enciphering the second combined block to generate a second block of ciphertext.

7. A method comprising:
deciphering a first block of ciphertext to generate a first block;
combining, with a processing device, a first initialization vector (IV) with a first sequence number of a first block of information to create a first combined IV, the first IV being generated based on a second IV;
hashing the first combined IV to create a first hash;
combining the first block of information corresponding to the first block of ciphertext from the first block with the first hash to create a first combined block.

8. The method of claim 7, wherein combining the first IV comprises concatenating the first sequence number of the first block of information with the second IV.

9. The method of claim 7, wherein combining the first IV comprises performing an exclusive-OR (XOR) operation on the first sequence number of the first block of information and the second IV.

10. The method of claim 7, wherein combining the first block comprises performing an exclusive-OR (XOR) operation on the first block of information and the first hash.

11. The method of claim 7, wherein the second IV is a salt stored with a file containing the first block of ciphertext, wherein the salt is encrypted using an encryption key, and wherein the method further comprises decrypting the salt before combining the first IV.

12. The method of claim 7, further comprising:
 deciphering a second block of ciphertext to generate a second block;
 creating a temporary IV based on the second IV and a second sequence number of a second block of information;
 combining a third IV with a second sequence number of a second block of information to create a second combined IV, the third IV being generated based on the second IV;
 hashing the second combined IV to create a second hash; and
 combining the second block of information corresponding to the second block of ciphertext from the second block with the second hash to create a second combined block.

13. A non-transitory computer readable storage medium comprising instructions that, when executed by a processing device, cause the processing device to perform operations comprising:
 combining, with the processing device, a first initialization vector (IV) with a first sequence number of a first block of information to create a first combined IV, the first IV being generated based on a second IV;
 hashing the first combined IV to create a first hash;
 combining a first block from the first block of information with the first hash to create a first combined block; and
 enciphering the first combined block to generate a first block of ciphertext.

14. The non-transitory computer readable storage medium of claim 13, wherein combining the first IV comprises concatenating the first sequence number of the first block of information and the second IV.

15. The non-transitory computer readable storage medium of claim 13, wherein combining the first IV comprises performing an exclusive-OR (XOR) operation on the first sequence number of the first block of information and the second IV.

16. The non-transitory computer readable storage medium of claim 13, wherein combining the first block comprises performing an exclusive-OR (XOR) operation on the first block of information and the first hash.

17. The non-transitory computer readable storage medium of claim 13, wherein the second IV is a salt stored with a file containing the first block of information, wherein the salt is encrypted using an encryption key, and wherein the operations further comprise decrypting the salt before combining the first IV.

18. The non-transitory computer readable storage medium of claim 13, further comprising:

combining a third IV with a second sequence number of a second block of information to create a second combined IV, the third IV being generated based on the second IV;
 hashing the second combined IV to create a second hash;
 combining a second block from the second block of information and with the second hash to create a second combined block; and
 enciphering the second combined block to generate a second block of ciphertext.

19. A non-transitory computer readable storage medium comprising instructions that, when executed by a processing device, cause the processing device to perform operations comprising:
 deciphering a first block of ciphertext to generate a first block;
 combining, with the processing device, a first initialization vector (IV) with a first sequence number of a first block of information to create a first combined IV, the first IV being generated based on a second IV;
 hashing the first combined IV to create a first hash;
 combining the first block of information corresponding to the first block of ciphertext from the first block with the first hash to create a first combined block.

20. The non-transitory computer readable storage medium of claim 19, wherein combining the first IV comprises concatenating the first sequence number of the first block of information with the second IV.

21. The non-transitory computer readable storage medium of claim 19, wherein combining the first IV comprises performing an exclusive-OR (XOR) operation on the first sequence number of the first block of information and the second IV.

22. The non-transitory computer readable storage medium of claim 19, wherein combining the first block comprises performing an exclusive-OR (XOR) operation on the first block of information and the first hash.

23. The non-transitory computer readable storage medium of claim 19, wherein the second IV is a salt stored with a file containing the first block of ciphertext, wherein the salt is encrypted using an encryption key, and wherein the operations further comprise decrypting the salt before combining the first IV.

24. The non-transitory computer readable storage medium of claim 19, further comprising:
 deciphering a second block of ciphertext to generate a second block;
 performing a third function to creating a second temporary IV based on the second IV and a second sequence number of a second block of information;
 combining a third IV with a second sequence number of a second block of information to create a second combined IV, the third IV being generated based on the second IV;
 hashing the second combined IV to create a second hash; and
 combining the second block of information corresponding to the second block of ciphertext from the second block and with the second hash to create a second combined block.

25. A system, comprising:
a data storage device; and
a processing device, coupled to the data storage device, to:
 combine a first initialization vector (IV) with a first sequence number of a first block of information to create a first combined IV, the first IV being generated based on a second IV;

hash the first combined IV to create a first hash;
combine a first block from the first block of information with the first hash to create a first combined block; and
encipher the first combined block to generate a first block of ciphertext.

26. The system of claim 25, wherein the processing device is further to:
combine a third IV with a second sequence number of a second block of information to create a second combined IV, the third IV being generated based on the second IV;
hash the second combined IV to create a second hash;
combine a second block from the second block of information with the second hash to create a second combined block; and
encipher the second combined block to generate a second block of ciphertext.

\* \* \* \* \*